(12) United States Patent
Cotner et al.

(10) Patent No.: US 7,899,797 B2
(45) Date of Patent: Mar. 1, 2011

(54) PACKAGE RESOLUTION MECHANISM FOR DATABASE SYSTEMS

(75) Inventors: Curt L. Cotner, Gilroy, CA (US); Tammie Dang, Morgan Hill, CA (US); Brian K. Howell, San Jose, CA (US); Fung Lee, Daly City, CA (US); Hui-An Lee, San Jose, CA (US); Charles H. Lin, San Jose, CA (US); Claire W. McFeely, San Jose, CA (US); Jennifer W. Ou, Cupertino, CA (US); James W. Pickel, Gilroy, CA (US); Jay A. Yothers, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 10/730,192

(22) Filed: Dec. 4, 2003

(65) Prior Publication Data

US 2005/0125410 A1 Jun. 9, 2005

(51) Int. Cl.
*G06F 7/00* (2006.01)
*G06F 17/30* (2006.01)
(52) U.S. Cl. .................. 707/702; 707/758; 707/769
(58) Field of Classification Search ............... 707/2
See application file for complete search history.

(56) References Cited

U.S. PATENT DOCUMENTS

| | | | |
|---|---|---|---|
| 6,317,880 B1* | 11/2001 | Chamberlain et al. | 717/174 |
| 6,321,235 B1* | 11/2001 | Bird | 707/203 |
| 6,353,833 B1* | 3/2002 | Bird et al. | 707/201 |
| 6,510,439 B1* | 1/2003 | Rangarajan et al. | 707/201 |
| 6,609,123 B1 | 8/2003 | Cazemier et al. | |
| 2001/0049682 A1 | 12/2001 | Vincent et al. | |
| 2002/0123978 A1* | 9/2002 | Bird et al. | 707/1 |
| 2003/0055820 A1 | 3/2003 | Aigen | |
| 2003/0060913 A1* | 3/2003 | Turner et al. | 700/103 |
| 2003/0074360 A1* | 4/2003 | Chen et al. | 707/100 |

OTHER PUBLICATIONS

IBM TDB/RD: Article 456145, "*Conservative binding semantics for SQL objects and static DMI statements in packages handling for the newly introduced execute privilege of a routine*", (Apr. 2002); 2 pp.
Link, J. et al., "*DB2-805 SQL Analysis and Resolution*", (Nov. 1, 1999); pp. 1-22.

* cited by examiner

*Primary Examiner*—Jay A Morrison
(74) *Attorney, Agent, or Firm*—Sawyer Law Group, P.C.

(57) ABSTRACT

A method and system for providing package resolution in a database system is disclosed. The method and system comprise providing a statement within a server which allows an application to identify a list of package collections. The method and system further includes executing the statement to obtain the appropriate package. A system and method in accordance with the present invention provides a new current package path value, which is set via a statement referred to as Set Current Package Path. The SET CURRENT PACKAGE PATH statement allows the application to supply a precedence list of qualified package collections during execution time, therefore the scheme for resolving packages can be changed at any point during execution. The SET CURRENT PACKAGE PATH statement improves application development by making the package resolution mechanism less error prone and less tedious for the application developer, while providing an optimal-performance solution in the client-server environment.

15 Claims, 3 Drawing Sheets

PACKAGE RESOLUTION MECHANISM FOR DATABASE SYSTEMS

FIELD OF THE INVENTION

The present invention relates generally to database systems and more particularly to a package resolution mechanism in a database system.

BACKGROUND OF THE INVENTION

FIG. 1 is a block diagram of a database system 10. The system includes an application 12 which communicates with a database server 14. The application 12 includes host language and SQL statements which are utilized to communicate with the server to obtain the appropriate information from the tables therein. The database server 14 typically prepares or converts the host language to allow the application to be executed (by the server). This preparation or process is referred to as preparing a package. A package is typically identified uniquely by an application program identifier (application ID) and a collection identifier (collection ID).

The server includes a memory 20 and an optimizer 22. The optimizer 22 provides the best access path for the information from tables of a user database 16 for a particular package from a plurality of packages 26 in a DB2 catalog 18. The best access path is provided via a bind process. The server 14 is in turn in communication with the DB2 catalog 18 and a user database 16.

The ability to switch between various packages and provide package resolution on a database server is a useful function for SQL applications. For example, it may be desirable to create multiple collection IDs containing the same package name in order to allow different bind options or SQL access paths to be in effect. Certain database management systems such as DB2 Universal Database for z/OS by IBM Corporation have offered solutions that involve a list of possible package collections that the SQL applications are bound into.

The database server would use this list to locate a matching package, where the list of packages is specified during static bind of the application plan and thus not changeable during execution time. Further, execution environments where remote clients are connected do not have the ability to run with application plans, thus the ability to switch between packages is very limited.

One solution is for the application to specify to the database server its package collection via a SQL statement, referred to as SET CURRENT PACKAGESET. The drawback with this solution is that multiple programs within the application need to coordinate the setting of the CURRENT PACKAGESET value, and it is difficult to keep the correct value in the CURRENT PACKAGESET register of the application at all times when the application is complex (e.g. lots of separately compiled programs that make up a large application).

Given a set of packages such as JDBC_COLLECTION, SQLJ_COLL1 and SQLJ_COLL2 when utilizing the SET CURRENT PACKAGESET statement, a programmer would have to code application logic in the following manner when utilizing the SET CURRENT PACKAGESET statement:
SET CURRENT PACKAGESET="JDBC_COLLECTION"
perform some JDBC logic
SET CURRENT PACKAGESET="SQLJ_COLL1"
run SQLJ logic
SET CURRENT PACKAGESET="JDBC_COLLECTION"
perform more JDBC logic
SET CURRENT PACKAGESET="SQLJ_COLL2"
Run SQLJ logic Accordingly, the application developer is only able to specify a single package collection name at any given point in time via the CURRENT PACKAGESET. As the application moved from subroutine to subroutine, the application developer had to be very careful to set and restore the CURRENT PACKAGESET value properly so that the current package collection was in effect at all times.

With the conventional database system, a plan's package list was managed by the client. If the client's package collection list contained "A, B, C, D", the client would flow the SQL statement across the network once for each package collection until the correct package containing the SQL statement is found. Thus in the worst case, the client would send the SQL statement to the server four times before finding a matching package.

Another problem with the list of package collections associated with each plan is observed in the stored procedure and user-defined function execution environment. Stored procedures and user-defined functions are often stand-alone sets of programs and invoked by multiple callers. However, users cannot identify package resolution schemes independently from the rules established by the plan, because the plan's list is always used to search packages as the stored procedures are executed. A solution for package management is needed that will allow nested storage procedures or user-defined functions to be implemented without concern for the caller's runtime environment.

Accordingly, what is needed is a system and method for package resolution in a database system that overcomes the above-identified problems. The present invention addresses such a need.

SUMMARY OF THE INVENTION

A method and system for providing package resolution in a database system is disclosed. The method and system comprise providing a statement within a server which allows an application to identify a list of package collections. The method and system further includes executing the statement to obtain the appropriate package.

A system and method in accordance with the present invention provides a new current package path value, which is set via a statement referred to as SET CURRENT PACKAGE PATH. The SET CURRENT PACKAGE PATH statement allows the application to supply a precedence list of qualified package collections during execution time, therefore the scheme for resolving packages can be changed at any point during execution. The SET CURRENT PACKAGE PATH statement improves application development by making the package resolution mechanism less error prone and less tedious for the application developer, while providing an optimal-performance solution in the client-server environment.

DETAILED DESCRIPTION OF THE INVENTION

The present invention relates generally to database systems and more particularly to a package resolution mechanism in a database system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides a new current package path value in the server, which is set via a statement referred to as Set Current Package Path. In a preferred embodiment this statement is an SQL statement. One of ordinary skill in the art readily recognizes however that the statement could be in a variety of languages and its use would still be within the spirit and scope of the present invention. This SQL statement allows the application to identify a precedence list of package collections that is used during package resolution. The CURRENT PACKAGE PATH value contains a list of collections for packages. The value is maintained and updated through the SET CURRENT PACKAGE PATH statement.

Figure 1:
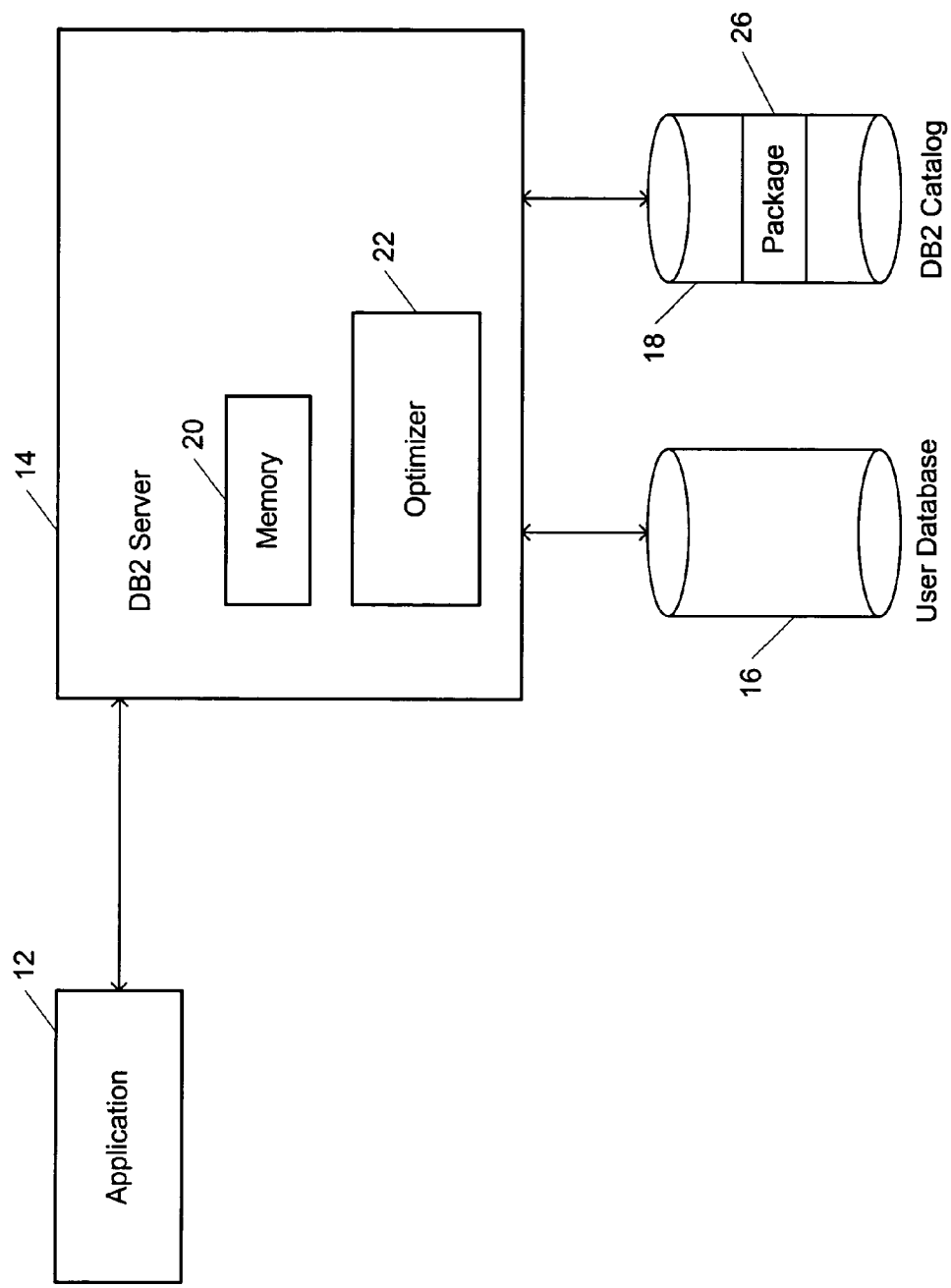
FIG. 1 is a block diagram of a database system.
Figure 2:
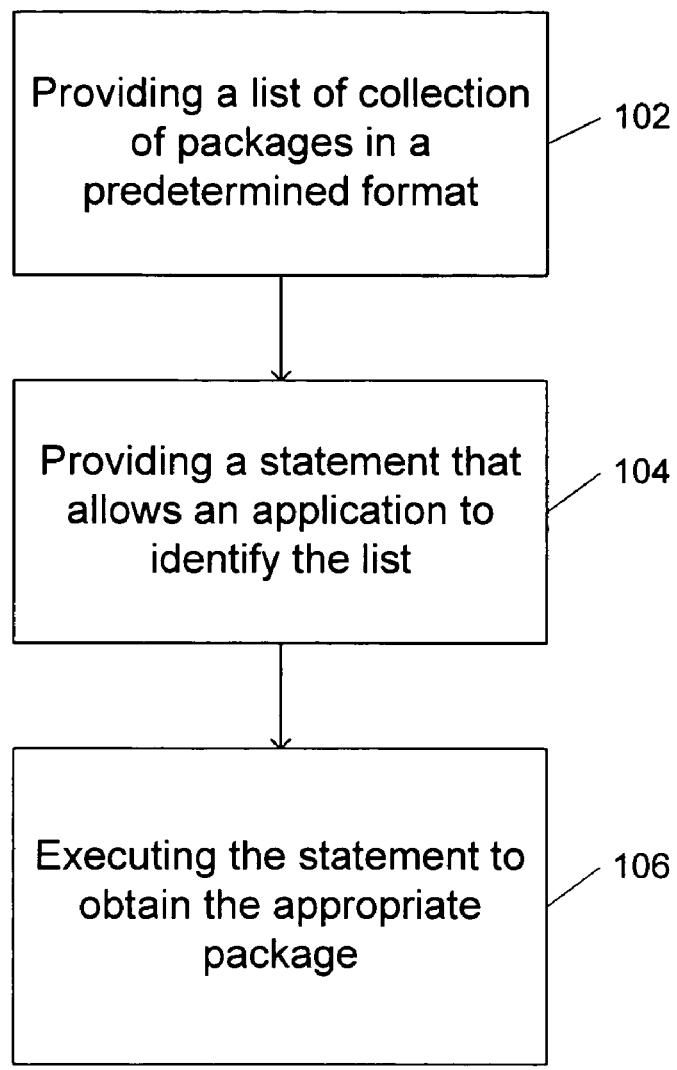
FIG. 2 is a flow chart for a package resolution system in accordance with the present invention.

FIG. 2 is a flow chart for a package resolution system in a database system in accordance with the present invention. First, a list of a collection of packages are provided in a predetermined format is provided, via step 102. Next, a statement is provided in a server that allows an application to identify the list, via step 104. Finally, the statement can be executed to obtain the appropriate package, via step 106.

The list of package collections can include literals, host variables, keywords, and null string. At the thread level, the list of package collections is built in an array format after syntax checking, duplicate values eliminating, and keyword resolution. During subsequent SQL statement execution, the database server will use this list to locate the package that contains the bound SQL statement in the order of the specified entries. Accordingly, the server locates the package rather than the client. For instance, if the CURRENT PACKAGE PATH value contains "A, USER, C", the resolved collections are "A", "ADMF001", "C" where ADMF001 is the current primary user ID. The search for an outstanding package will be performed with using collection A first. If such package is not found, a locate will be done with collection ADMF001, and so on.

The package loading process often includes an authorization check, a catalog lookup, and a potential storage reading that is very expensive. As packages are located, they are cached in memory at each thread level as "found" package entries. The found packages can be reused on subsequent SQL statements, or as application logic switches to a different package and then back. As searching through the list, the thread also keeps track of the packages that were not found, to prevent having to repeatedly look up a non-existing package. This keeping track can be implemented by creating "not-found" entries in the table of the user database. The not-found cached entries help to minimize look up of entries in the database catalog for a bound package. When searching through the table the thread would recognize the not-found entries, skip the loading process for such collection, and move on to the next collection. All found and not-found entries in the cache have an identifier that can include for example, local server name, collection, program name, and timestamp when the program was precompiled.

As before-mentioned with the conventional SET CURRENT PACKAGESET statement the client had to control the list of packages. In addition only a single collection package could be specified at any point in time. Once again to repeat the example given before given a set of packages such as JDBC_COLLECTION, SQLJ_COLL1 and SQLJ_COLL2 when utilizing the SET CURRENT PACKAGESET statement, a programmer would have to code application logic in the following manner when utilizing the SET CURRENT PACKAGESET statement:

SET CURRENT PACKAGESET="JDBC_COLLECTION"
perform some JDBC logic
SET CURRENT PACKAGESET="SQLJ_COLL1"
run SQLJ logic
SET CURRENT PACKAGESET="JDBC_COLLECTION"
perform more JDBC logic
SET CURRENT PACKAGESET="SQLJ_COLL2"

With the CURRENT PACKAGE PATH statement in accordance with the present invention, the application developer's job is greatly simplified. To illustrate this simplification refer now to the coded application logic below.

First the statement that identifies all of the collections in one statement appears below:

---
SET CURRENT PACKAGE PATH = "SQLJ_COLL1, SQLJ_COLL2, → JDBC_COLLECTION"

---

Then the JDBC and SQLJ logic only has to be performed one time as shown below:
perform some JDBC logic
run SQLJ logic
perform more JDBC logic

Newly Bound Packages

At certain points, a newly bound package may come to existence via the bind process, and the application may desire to use it (especially if its collection is at the front of the CURRENT PACKAGE PATH). The not-found entries for packages would have to be invalidated in the cache table in order for the subsequent search to locate and load in the newly bound package. For example, when the transaction is committed or when the thread is reused for a new connection, the package cache table's not-found entries can be cleared out. An example of this type of transaction is illustrated below.

First; Program 1 issues:

---
| | |
|---|---|
| SET CURRENT PACKAGE PATH = A, B, C | |
| SELECT FROM Table 1 in user database | → package B.program 1 is loaded and cached. |
| | → A dummy not-found package for A.program1 is also cached. |

---

Then, Program 2 is called which issues:

| | |
|---|---|
| SELECT FROM Table 2 in the user database → package A.program2 is loaded and cached. | |
| Then return to Program 1 | |
| INSERT INTO Table1 | → package B.program1 is found in the cache and used |
| COMMIT | → cache table is cleaned up |
| UPDATE Table 1 | → package searching is done for A.program1 and may load if it exists |

Since there may be other factors affecting package resolution, such as a CURRENT PACKAGESET value, a precedence rule must be established. The proposed mechanism assumes the CURRENT PACKAGE PATH as highest in the precedence rule, followed by the CURRENT PACKAGESET value if turned on, followed by the static package list bound into the plan.

Distributed Environment

Figure 3:
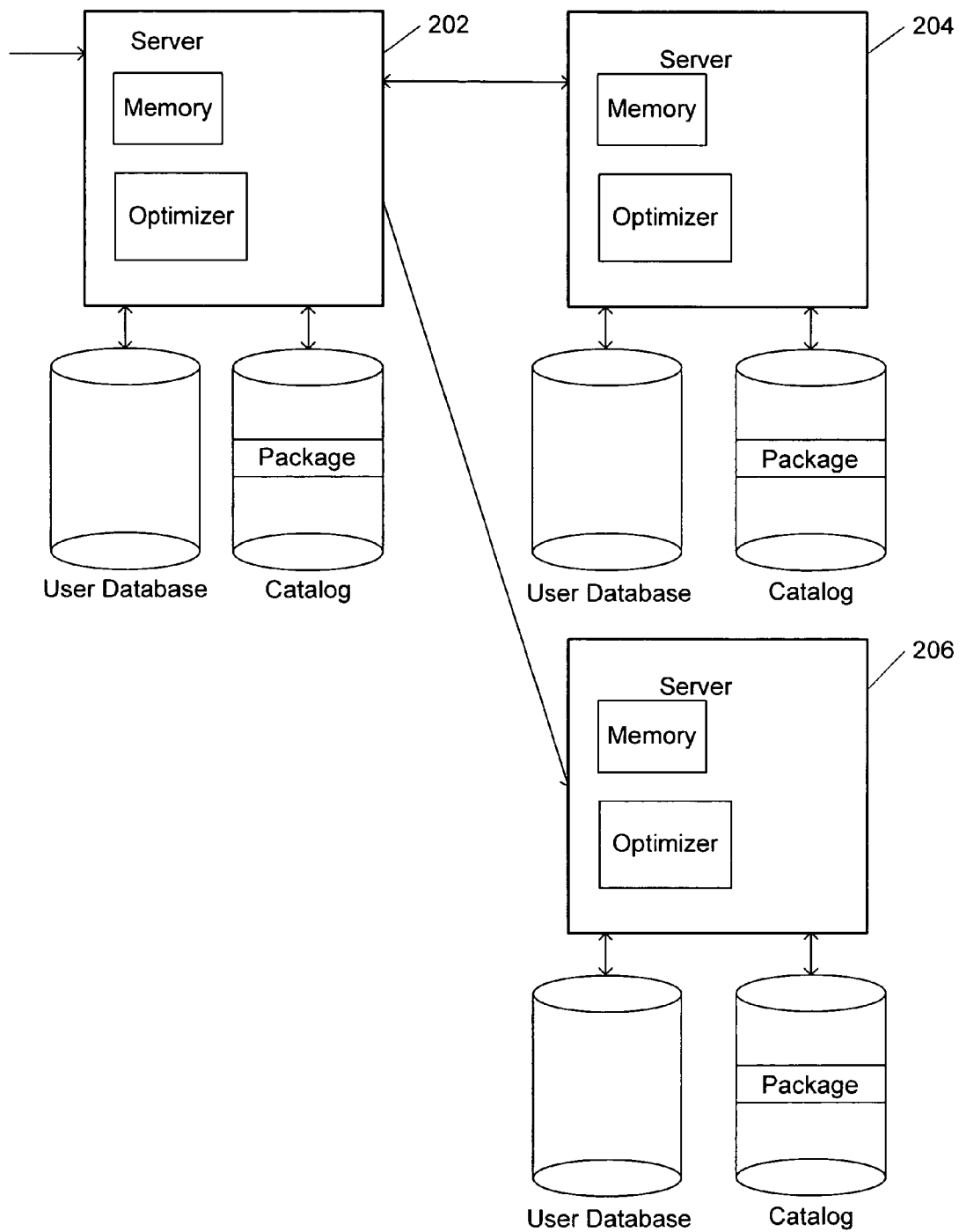
FIG. 3 illustrates a distributed environment where there is a plurality of database systems in accordance with the present invention.

FIG. 3 illustrates a distributed environment 100 where there is a plurality of database server systems 202 through 206 in accordance with the present invention. In a distributed environment, the CURRENT PACKAGE PATH value is location sensitive, that is, the order of its setting (via the SET CURRENT PACKAGE PATH SQL statement) and when a remote site connection is established (via the CONNECT SQL statement) matters. It is the responsibility of the client to propagate this value to the server in the event that the value is set, so that all subsequent SQL operations will utilize the new value. In terms of implementation in some database systems, the value flows using a DRDA set environment command (EXCSQLSET), which is outside of the standard value received on the EXCSQLSET command, and this value is utilized as the list of package collections to search on all subsequent remote operations.

To illustrate this in the context of an example refer now to the below description in conjunction with FIG. 3.

First, CONNECT TO SERVER 202, assuming server 202 is the local server. Then SET CURRENT PACKAGE PATH=A, B, C. Next, the server 202 uses CURRENT PACKAGE PATH(A,B,C) value to locate package. Next, CONNECTS TO server 204, SET CURRENT PACKAGE PATH=D, E, F. Then, thereafter CURRENT PACKAGE PATH(D, E, F) is provided to server 204 and used to locate the package there. Finally, CONNECT TO server 206. Server 202 sends collections A, B, and C one at a time to server 206 and they are used to search package.

Accordingly, the SET CURRENT PACKAGE PATH statement provides improved performance for remote clients. With the CURRENT PACKAGE PATH value, the package precedence list is sent to the server and the server manages the package resolution search. Accordingly each statement only has to flow to the server once, which has the potential to greatly reduce network traffic in some applications.

Advantages

There are several key advantages to the SET CURRENT PACKAGE PATH statement in accordance with the present invention:

1) The SET CURRENT PACKAGE PATH statement allows the application to supply a precedence list of qualified package collections during execution time, therefore the scheme for resolving packages can be changed at any point during execution (rather than being statically established at program preparation time as in the conventional system). The application program has a lot more flexibility in resolving package names, since the package resolution scheme can change from one part of the application to another.

2) The SET CURRENT PACKAGE PATH statement improves application development by making the package resolution mechanism less error prone and less tedious for the application developer. With the SET CURRENT PACKAGE PATH mechanism, the application developer can establish a search precedence list for package collections, and in many cases it is only necessary to establish this precedence list once or twice during life of the application. This greatly reduces the complexity of managing package resolution for complex applications programs. Java development in SQLJ is an example where this advantage is particularly apparent. In Java programs, it is common to use both JDBC and SQLJ in a single application program. The JDBC package is typically in one package collection, and the SQLJ packages are typically in separate package collections.

3) The SET CURRENT PACKAGE PATH statement also provides improved performance for remote clients. With the CURRENT PACKAGE PATH, the package precedence list is sent to the server and the server manages the package resolution search. Accordingly each statement only has to flow to the server once, which has the potential to greatly reduce network traffic in some applications.

4) The SET CURRENT PACKAGE PATH statement is also able to support nested stored procedures and UDFs, so that package resolution for these programs can happen totally independently from the package resolution used by the calling program. This makes it much easier for the application developer to write stored procedures or UDFs without concern for the caller's package resolution scheme.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing package resolution in a database system, the method comprising:

providing a SET CURRENT PACKAGE PATH statement within a server of the database system, wherein the SET CURRENT PACKAGE PATH statement identifies a selected list of a plurality of qualified package collections during runtime, wherein each identified package collection includes a plurality of packages and each package is usable during execution of one or more other database statements issued by the application;

responsive to issuance of a database statement by the application, executing the database statement to search the qualified package collections in the search precedence order and locate at least one of the plurality of packages included in at least one of the identified package collections, the located at least one package for use with the database statement; and caching the at least one package in a storage of the server, the at least one package being used during execution of the one or more other database statements issued by the application, and in response to not finding a particular package in an associated one of the package collections during the search of the package collections, creating a not-found entry in a user database for the not-found package, such that subsequent searches for the not-found package find the not-found entry and skip a loading process for the associated package collection.

2. The method of claim 1, wherein the list of package collections include a combination of literals, host variables, keywords, and null string.

3. The method of claim 1, wherein each package includes a collection ID and a package ID.

4. The method of claim 1, wherein the database system is a distributed database system.

5. A database server system comprising:
   a catalog containing a plurality of package collections; and
   a server coupled to the catalog, the server:
   providing a SET CURRENT PACKAGE PATH statement, wherein the SET CURRENT PACKAGE PATH statement identifies a selected list of a plurality of qualified package collections during runtime from among the plurality of package collections contained in the catalog, wherein each identified package collection includes a plurality of packages and each package is usable during execution of one or more other database statements issued by the application;
   responsive to issuance of a database statement by the application, executing the database statement to search the qualified package collections in the search precedence order and locate at least one of the plurality of packages included in at least one of the identified package collections, the located at least one package for use with the database statement;
   caching the at least one package in a storage of the server, the at least one package being used during execution of the one or more other database statements issued by the application, and
   in response to not finding a particular package in an associated one of the package collections during the search of the package collections, creating a not-found entry in a user database for the not-found package, such that subsequent searches for the not-found package find the not-found entry and skip a loading process for the associated package collection.

6. The server system of claim 5, wherein the list of package collections include a combination of literals, host variables, keywords and null string.

7. The server system of claim 5, wherein each package includes a collection ID and a package ID.

8. The server system of claim 5, wherein the database server system is a distributed database server system.

9. A computer readable medium encoded with a computer program for providing package resolution in a database system, the computer program comprising instructions for:
   providing a SET CURRENT PACKAGE PATH statement within a server of the database system, wherein the SET CURRENT PACKAGE PATH statement identifies a selected list of a plurality of qualified package collections during runtime, wherein each identified package collection includes a plurality of packages and each package is usable during execution of one or more other database statements issued by the application;
   responsive to issuance of a database statement by the application, executing the database statement to search the qualified package collections in the search precedence order and locate at least one of the plurality of packages included in at least one of the identified package collections, the located at least one package for use with the database statement;
   caching the at least one package in a storage of the server, the at least one package being used during execution of the one or more other database statements issued by the application, and
   in response to not finding a particular package in an associated one of the package collections during the search of the package collections, a not-found entry is created in a user database for the not-found package, such that subsequent searches for the not-found package find the not-found entry and skip a loading process for the associated package collection.

10. The computer readable medium of claim 9, wherein the list of package collections include a combination of literals, host variables, keywords and null string.

11. The computer readable medium of claim 9, wherein each package includes a collection ID and a package ID.

12. The computer readable medium of claim 9, wherein the database system is a distributed database system.

13. The method of claim 1, wherein the database statement is a structured query language (SQL) statement.

14. The server system of claim 5, wherein the database statement is a structured query language (SQL) statement.

15. The computer readable medium of claim 9, wherein the database statement is a structured query language (SQL) statement.

* * * * *